(12) United States Patent
Gentilcore et al.

(10) Patent No.: US 7,625,955 B2
(45) Date of Patent: Dec. 1, 2009

(54) POROUS POLYMERIC ARTICLE

(75) Inventors: Giovanni Gentilcore, Wiltshire (GB); Tracy Hoar, Swindon (GB)

(73) Assignee: Freudenberg Nonwovens LP (GB)

( * ) Notice: Subject to any disclaimer, the term of this patent is extended or adjusted under 35 U.S.C. 154(b) by 572 days.

(21) Appl. No.: 10/525,895

(22) PCT Filed: Aug. 11, 2003

(86) PCT No.: PCT/GB03/03494

§ 371 (c)(1),
(2), (4) Date: Oct. 3, 2005

(87) PCT Pub. No.: WO2004/020730

PCT Pub. Date: Mar. 11, 2004

(65) Prior Publication Data

US 2006/0154043 A1    Jul. 13, 2006

(30) Foreign Application Priority Data

Aug. 28, 2002 (GB) .............................. 0220044.2
Oct. 25, 2002 (GB) .............................. 0224810.2

(51) Int. Cl.
C08F 2/50      (2006.01)
C08J 3/28      (2006.01)
B01J 41/14     (2006.01)
B01J 39/18     (2006.01)

(52) U.S. Cl. ............... 522/120; 522/113; 522/114; 522/121; 522/127; 522/133; 522/157; 522/158; 522/27; 521/30; 521/32; 521/33; 521/31; 521/38; 525/267; 525/291; 525/298; 525/301; 525/302; 525/307; 525/308; 525/305

(58) Field of Classification Search ............... 522/113, 522/114, 120, 121, 127, 133, 150, 157, 158; 521/30, 27, 32, 33, 31, 38; 525/244, 267, 525/291, 298, 301, 302, 307, 305, 308

See application file for complete search history.

(56) References Cited

U.S. PATENT DOCUMENTS 4,346,142 A * 8/1982 Lazear ..................... 428/315.7
5,648,400 A * 7/1997 Sugo et al. ................... 521/30
5,798,417 A    8/1998 Howard, Jr.
5,830,604 A   11/1998 Singleton et al.
6,242,041 B1  6/2001 Katoot et al.
6,573,695 B2 * 6/2003 Shashoua ................... 323/282

FOREIGN PATENT DOCUMENTS

| EP | 0 054 841 A2 | 6/1982 |
| EP | 0 405 793 A2 | 1/1991 |
| EP | 0 874 409 A2 | 10/1998 |
| JP | 48-32986 | 5/1973 |
| JP | 63-105182 | 5/1988 |
| JP | 02-0212527 A | 8/1990 |
| JP | 04-0132713 A | 5/1992 |
| JP | 07-0145559 A | 6/1995 |
| JP | 09-0077900 A | 3/1997 |
| JP | 11-0106552 A | 4/1999 |
| JP | 11106552 A * | 4/1999 |
| JP | 11-238496 | 8/1999 |
| JP | 11293564 A * | 10/1999 |
| JP | 11-323731 | 11/1999 |
| JP | 2001-172867 | 6/2001 |
| WO | WO-92/15637 A2 | 9/1992 |
| WO | WO-93/01622 A1 | 1/1993 |

OTHER PUBLICATIONS

Patent Abstract of Japan, vol. 2000, No. 1, Jan. 31, 2000 & JP 11 293564 A (Toray Ind. Inc) Oct. 26, 1999.

* cited by examiner

*Primary Examiner*—Sanza L McClendon
(74) *Attorney, Agent, or Firm*—Lerner, David, Littenberg, Krumholz & Mentlik, LLP (57) ABSTRACT

A porous article which is formed from a polymeric material, in which characteristics of the surface of the article provided by the polymeric material are modified by having grafted to it chains of polymerized vinyl monomer units, in which the chains each comprise a number of units of a first vinyl monomer and include a unit of a second vinyl monomer which is different from the first vinyl monomer. Preferably, the ratio of the number of units of the first vinyl monomer in each chain to the number of units of the second vinyl monomer is not more than about 60. When the number of second vinyl monomer units in each chain is one, the mean number of first vinyl monomer units in each chain will be not more than 60.

22 Claims, 1 Drawing Sheet

POROUS POLYMERIC ARTICLE

FIELD OF THE INVENTION

The present invention relates to a porous article which is formed from a polymeric material, and to a method of making a porous polymeric article.

BACKGROUND OF THE INVENTION

Many polymeric materials are hydrophobic. This property can restrict the use of the materials in applications in which they come into contact with water or aqueous solutions because articles made from such hydrophobic materials are not wetted. Similarly, a polymeric material which is hydrophilic might be unsuitable for an application in which hydrophobic properties are required.

Techniques are known for the treatment of polymeric materials which are hydrophobic so that they can be wetted by aqueous solutions. For example, International Application No. WO-93/01622 discloses a technique in which a non-woven fabric made from a polyolefin such as polypropylene is exposed to ultraviolet radiation while impregnated with a solution of acrylic acid. This results in a grafting reaction between the acrylic acid and the polypropylene of the fiber surfaces, and in crosslinking of the polypropylene. The resulting fabric can be wetted by aqueous solutions. Furthermore, the wettability does not degrade on exposure to alkali, and the tensile strength of the fabric is not adversely affected by the grafting treatment. The fabric which results from this treatment can be used as an electrode separator in an electrochemical device in which the electrolyte comprises an aqueous solution.

The properties of a fabric which is produced by the technique disclosed in WO-93/01622 depend on the amount of the vinyl monomer which is grafted to the fabric. It is important that sufficient monomer is grafted to the fabric for the fabric to be wetted. However, vinyl monomer which is grafted to the fabric can tend to swell when the fabric is exposed to an aqueous solution. This is undesirable because it can reduce the porosity of the fabric. Accordingly, while the amount of vinyl monomer which grafts to surface of the fabric should be sufficient for the fabric to be wetted, it should be controlled and not allowed to reach unnecessarily high levels.

SUMMARY OF THE INVENTION

In accordance with the present invention, this and other objects have now been realized by the discovery of a porous article which is formed from a polymeric material, the polymeric material modified by chains of polymerized units of a first vinyl monomer grafted thereto, so as to modify the surface characteristics of the porous article, the mean number of the first vinyl monomer units in each chain being not more than about 60. Preferably, the chains of the polymerized units of the first vinyl monomer include a second vinyl monomer.

In accordance with the present invention, a porous article has been discovered which is formed from a polymeric material, the polymeric material modified by chains of polymerized vinyl monomer units grafted thereto, so as to modify the surface characteristics of the porous article, the chains of polymerized vinyl monomer units comprising a predetermined number of units of a first vinyl monomer and including a unit of a second vinyl monomer which is different from the first vinyl monomer. Preferably, the ratio of the number of units of the first vinyl monomer in each chain to the number of units of the second vinyl monomer is not more than about 60.

In accordance with one embodiment of the article of the present invention, the mean number of the first vinyl monomer units in each chain is not more than about 60.

In accordance with another embodiment of the article of the present invention, the chains of the first vinyl monomer are capped by a unit of the second vinyl monomer.

In accordance with another embodiment of the article of the present invention, the mean number of the first vinyl monomer units in each chain is not more than about 30.

In accordance with another embodiment of the article of the present invention, the porous article comprises a nonwoven fabric formed from fibers whose surface is provided by the polymeric material.

In accordance with another embodiment of the article of the present invention, the polymeric article comprises a microporous sheet.

In accordance with another embodiment of the article of the present invention, the first vinyl monomer comprises an ethyleneically unsaturated carboxylic acid or an ester thereof. Preferably, the first vinyl monomer comprises acrylic acid or an ester thereof.

In accordance with another embodiment of the article of the present invention, the second vinyl monomer is selected from the group consisting of vinyl acetic acid, vinyl sulphonic acid, vinyl phosphonic acid, and the salts or esters thereof.

In accordance with another embodiment of the article of the present invention, the polymeric material comprises polypropylene.

In accordance with the present invention, an electrochemical device has also been discovered which comprises an anode, a cathode, a quantity of an electrolyte, and an electrode separator which is provided by a porous article as discussed above.

In accordance with the present invention, a method of making a porous polymeric article whose surface has chains of polymerized vinyl monomer groups grafted thereto has also been discovered, which comprises impregnating a porous polymeric article with a solution of a first vinyl monomer and a second vinyl monomer, exposing the impregnated article to ultraviolet radiation while exposure of the article to oxygen is restricted, to cause (i) the first vinyl monomer to form polymerized chains which are grafted to the surface of the polymeric article, and (ii) the second vinyl monomer to react with the polymerized chains of the first vinyl monomer. Preferably, the porous polymeric article comprises a nonwoven fabric formed from fibers whose surface is provided by a polymeric material. In another embodiment, the polymeric article comprises a microporous sheet.

In accordance with one embodiment of the method of the present invention, the first vinyl monomer comprises an ethyleneically unsaturated carboxylic acid or an ester thereof. Preferably, the first vinyl monomer comprises acrylic acid or an ester thereof.

In accordance with another embodiment of the method of the present invention, the second vinyl monomer is selected from the group consisting of vinyl acetic acid, vinyl sulphonic acid, vinyl phosphonic acid, and the salts or esters thereof.

In accordance with another embodiment of the method of the present invention, the ratio of the molar concentration of the first vinyl monomer in the solution to that of the second vinyl monomer is at least about 1.5.

In accordance with another embodiment of the method of the present invention, the polymer comprises polypropylene.

The present invention provides a technique for treating a porous polymeric article using a mixture of first and second vinyl monomers, in which the second vinyl monomer is less reactive than the first vinyl monomer and can restrict the formation of grafted chains of the first vinyl monomer on the surface of the article.

Accordingly, in one aspect, the invention provides a porous article which is formed from a polymeric material, the polymeric material having grafted to it chains of polymerized units of a first vinyl monomer, in which the mean number of vinyl monomer units in each chain is not more than 60.

Preferably, the chains of the first vinyl monomer include a unit of a second vinyl monomer.

In another aspect, the invention provides a porous article which is formed from a polymeric material, the polymeric material having grafted to it chains of polymerized vinyl monomer units, in which the chains each comprise a number of units of a first vinyl monomer and include a unit of a second vinyl monomer which is different from the first vinyl monomer.

BRIEF DESCRIPTION OF THE DRAWINGS

The present invention will be more fully appreciated with reference to the following Detailed Description which, in turn, refers to the Figures , in which.

DETAILED DESCRIPTION

Preferably, the mean number of first vinyl monomer units in each chain is not more than 50, more preferably not more than about 40, especially not more than about 30, for example not more than about 20. The number of first vinyl monomer units in each chain can be measured by (a) identifying a marker feature in the first vinyl monomer units which is visible using an appropriate analytical technique, by which individual vinyl monomer units can be counted, and (b) including a marker species in each chain so that the chains can be counted. The mean number of first vinyl monomer units in a grafted chain can be determined from the ratio of the number of first vinyl monomer units (from the number of marker features that can be identified) to the number of marker species in the article. It can be convenient for the marker species to be provided by the second vinyl monomer units when there is about one second vinyl monomer unit in each chain, and when the second vinyl monomer has a marker feature which is visible using an appropriate analytical technique. Techniques which can be used to determine the relative proportions of the marker feature and the marker species include X-ray photoelectron spectroscopy (as described in more detail below), other spectroscopic techniques such as infra red and NMR spectroscopy, and isotope labelling. When a spectroscopic technique is used, the marker feature might be, for example, a carbon-oxygen carbonyl bond in acrylic acid, or a sulphur-oxygen bond in vinyl sulphonic acid.

Generally, it is expected that each of the chains of first vinyl monomer units will include one unit of the second vinyl monomer. However, it is highly likely that some, generally a few, of the chains of the first vinyl monomer units will include no units of the second vinyl monomer, or more than one unit.

Preferably, the ratio of the number of units of the first vinyl monomer in each chain to the number of units of the second vinyl monomer is not more than about 60, more preferably not more than about 45, for example not more than about 30. When the number of units of the second vinyl monomer in each chain is one, then the ratio of the number of units of the first vinyl monomer to the number of units of the second vinyl monomer will be approximately equal to the number of units of the first vinyl monomer in each chain.

The porous article of the invention has the advantage that the surface properties of the polymeric material can be modified by means of the presence of grafted monomer units. In particular, by selection of a vinyl monomer which includes hydrophilic groups, the polymeric material of the surface of the article can be made wettable. Furthermore, as in the product disclosed in WO-93/01622, the properties of the article which result from the grafting reaction are not affected by long term exposure to alkali, and the tensile strength and other physical properties of the article can be enhanced as a result of the treatment.

It has been found that the presence in the solution of the first vinyl monomer of a second vinyl monomer can provide control over the extent of the graft reaction between the polymeric material of the porous article and the first vinyl monomer. The first vinyl monomer will generally be selected to be one which is significantly more reactive towards the polymeric material of the porous article than the second vinyl monomer. The first vinyl monomer should also be capable of polymerizing so that chains of polymerized first vinyl monomer groups can form, grafted to the surface of the polymeric porous article. The second vinyl monomer should generally be less reactive in this sense than the first vinyl monomer, in particular so that the second vinyl monomer units will not react to form grafted polymer chains under the conditions used according to the present invention to form grafted chains of the first vinyl monomer on the surface of the polymer article. It seems likely that the reaction of the first vinyl monomer to lengthen a grafted chain is inhibited by the presence of a unit of the second vinyl monomer in the chain. The unit of the second vinyl monomer can cap the chain of the first vinyl monomer units.

The control over the reaction between the first vinyl monomer and the porous article means that the effect on the porous structure of the article can be controlled, while ensuring that there is sufficient monomer bonded to the surface of the article for the properties of the article to be modified as desired (for example to ensure that the surface of a hydrophobic polymer article can be wetted). For example, when the grafted monomer units swell under conditions to which the article is exposed in use, it can be important to minimize the extent of this swelling, by controlling the amount of monomer which grafts to the surface of the porous polymer article. It has also been found that the controlled degree of grafting of the monomer units on to the porous structure of the article can help to minimize the time taken for the article to be wetted out by a wetting liquid, and also that the rate of wicking of a liquid across the article can be reduced. These advantages can be important in the event that, by way of example, the article of the invention is used as an electrode separator in an electrochemical device. It can be important to minimize wetting out time and to increase wicking rate in order to optimize the efficiency of assembly of a device. Also, increased wicking rate can be important to ensure that electrode surfaces remain covered with electrolyte. Maintaining an open pore structure (with minimum obstruction due to swelling of the grafted monomer units) can also give rise to advantages because obstruction to gas flow through the article is minimized. This can be important to minimize obstruction to flow of oxygen gas through the article, preventing accumulation of gas during overcharging. Furthermore, the treatment of a porous polymer article according to the present invention can enhance its chemical stability, for example by retarding the rearrangement of grafted chains.

The article of the invention can be a woven or a non-woven fabric formed from fibers whose surfaces are provided by a polymeric material. The non-woven fabric can be made by processes which include (a) melt blowing, (b) spinning, and (c) wet or dry laying. The fibers of fabrics made by spinning and wet or dry laying can be bonded to one another so that the fabric has integrity, so that it has the mechanical properties required for satisfactory performance. In the case of fabrics made by spinning, the fibers can be bonded to one another by the application of heat and pressure. In the case of fabrics made by wet or dry laying, bonds can be formed by using a material in the fabric which softens when heated. For example, polyethylene can be incorporated into a fabric, either as fibers consisting essentially of polyethylene or as bicomponent fibers consisting of a polypropylene core and a polyethylene sheath. The polyethylene in the fabric can provide the necessary bonds as a result of heating the fabric to a temperature that is greater than the softening point of the polyethylene.

Preferably, the mean thickness of the fibers of non-woven fabric (which might be measured as a mean diameter, especially when the fibers have an approximately circular cross-section) is not more than about 30 μm, more preferably not more than about 20 μm. It can be smaller, especially when the fibers are formed by a spinning technique, for example not more than about 8 μm, preferably not more than about 5 μm. The thickness of the fibers of the fabric will often be at least about 0.5 μm, and can be about 5 μm or more, for example at least about 10 μm, when the fabric is formed by a technique such as wet or dry laying.

The article of the invention can be a microporous polymer sheet. Such sheets are well known. They can be formed by processes such as extrusion, followed by, for example, mechanical deformation, or removal of a component (for example in solution) from an extruded mixture of two or more components, or by a foaming process. Preferably, the pore size of the sheet, measured using a Coulter porometer, is at least about 0.01 μm, more preferably at least about 0.1 μm. Preferably, the pore size of the sheet is not more than about 5 μm, more preferably not more than about 1.0 μm.

For many application, the thickness of the article of the invention will preferably be greater than about 25 μm, more preferably greater than about 50 μm; preferably, the thickness is less than about 400 μm, more preferably less than about 250 μm. When the article is compressible, for example because it is formed as a fabric from fibers, the thickness is measured using test method DIN 53105 which involves dropping a 2.0 kg weight onto a sample of the sheet of area 2.0 cm$^2$ at a speed of 2.0 mm·s$^{-1}$. The method by which the article is made can include a step of calendering the article to reduce its thickness to a value within the range referred to above, the reduction being by at least about 5%, preferably at least about 15%, more preferably at least about 25%, and less than about 60%, preferably less than about 45%, more preferably less than about 40%. The calendering step can take place before or after the material of the article is reacted with the vinyl monomer solution. Calendering the fabric before the graft reaction has been found to give rise to increased rates of the reaction.

The polymeric material on which the article of the invention is based should be capable of reacting with a vinyl monomer when the vinyl monomer and the polymeric material are exposed to ultraviolet radiation, with a photoinitiator or such other additional components as might be necessary. Examples of polymeric materials on which the article of the invention is based include polyamides, polyesters, polyethers, polyimides, polycarbonates, and halogenated polymers such as polyvinyl chloride, fluorinated ethylene propylene (FEP) polymers, and polyvinylidene fluoride. Preferably, the polymeric material comprises a polyolefin. Suitable polyolefins include polyethylene and polypropylene. The polymeric material can comprise more than one material as a mixture. For example, mixtures of polyolefins might be used. It can be particularly preferred to use mixtures of polyethylene and polypropylene. The fact that the technique of the invention can be used to treat polymeric articles having surfaces provided wholly or in part by polypropylene represents a significant advantage.

The polymeric material on which the article of the invention is based can comprise a mixture of two or materials. The article can be formed from two or more polymeric materials, for example in which the article comprises a first polymeric material on a first region and a second polymeric material in a second region. For example, an article can be formed as a fabric from fibers which comprise two or more materials. Fibers can be formed by coextrusion, for example in which the core of a fiber is provided by a first material, with a sheath of a second material around the core. Alternatively, fibers can be formed from first and second materials with the two materials arranged contiguously side-by-side.

Preferably, the material of at least some of the fibers from which a polymeric fabric is formed, for example at least about 40% by weight, preferably at least about 60%, more preferably at least about 80%, is substantially homogeneous throughout the thickness of the fibers. It can be preferred for many applications for the material of substantially all of the fibers to be substantially homogeneous throughout their thickness, so that those fibers are formed only from polypropylene or another suitable material (with appropriate additives where necessary).

It is an advantage of the present invention that it enables the surface of a polypropylene article to be treated without any degradation in the physical properties (for example tensile strength) of the article.

The first vinyl monomer should generally be capable of reacting with an acid or a base directly to form a salt, or indirectly to form a salt after appropriate work up, perhaps involving for example hydrolysis or sulphonation. Preferred first vinyl monomers include ethylenically unsaturated carboxylic acids and esters thereof such as acrylic acid and methyl acrylate. Other first vinyl monomers which might be used include acrylamide, substituted acrylamides such as N,N-dimethyl acrylamide, vinylpyridine and vinylpyrrolidone.

The second vinyl monomer will generally be less reactive than the first vinyl monomer in the sense that units thereof will not tend to react to form grafted chains under the conditions used according to the present invention to form grafted chains of the first vinyl monomer. Examples of suitable materials to provide the second vinyl monomer include vinyl sulphonic acid, vinyl phosphonic acid, vinyl acetic acid and methacrylic acid, and their salts and esters, especially the salts of alkali metals (of Group IA).

It can be preferred for some applications that the first vinyl monomer, or the second vinyl monomer, or each of the first and second vinyl monomers, does not include a nitrogen atom.

Preferably, the molecular weight of the second vinyl monomer is not more than about 200, more preferably not more than about 175, especially not more than about 150, for example not more than about 135.

In a further aspect, the invention provides a method of making a porous polymeric article whose surface has bonded to it chains of polymerized vinyl monomer groups, which comprises:

a. impregnating a porous polymeric article with a solution of a first vinyl monomer and a second vinyl monomer, b. exposing the impregnated article to ultraviolet radiation while exposure of the article to oxygen is restricted, to cause (i) the first vinyl monomer to form polymerized chains which are bonded to the surface of the polymeric article, and (ii) the second vinyl monomer to react with the polymerized chains of the first vinyl monomer.

Preferably, the ratio of the molar concentration of the first vinyl monomer in the solution to that of the second vinyl monomer is at least about 1.5, more preferably at least about 1.75, for example at least about 1.9. Preferably, the the ratio is not more than about 35, more preferably not more than about 25, especially not more than about 15, particularly not more than about 10, for example not more than about 7.5.

It has been found that the relative concentrations of the first and second vinyl monomers in the grafting solution can affect the length of the chains of the first vinyl monomer units on the surface of the article. This control over the length of the chains represents a significant advantage of the process of the invention.

The solvent for the first and second vinyl monomers should not evaporate to a significant degree in the irradiation step of the method. This has been found to confer the advantages of providing greater uniformity of properties of the resulting article, throughout the thickness of the article. Thus there is greater uniformity in the degree of grafting throughout the thickness of the article, leading to improved ion exchange properties through the article. It is believed that this might arise at least in part because of the transparency of the article which is retained as a result of the retention of the solvent in the pores of the fabric. It has also been found that the degree or adverse effects or both of homopolymerization of the vinyl monomers (especially the first vinyl monomer) can be reduced by selection of an appropriate solvent.

Suitable solvents for use in the method of the invention will generally be transparent to ultraviolet radiation, have no atoms which are abstractable when exposed to radiation, have a high specific heat and a high latent heat of vaporization, and will not react adversely with the material of the porous article. Preferred solvents will have a boiling point which is greater than about 50° C., preferably greater than about 70° C. It is also preferred that the boiling point of the solvent be no higher than a temperature at which the porous article might be damaged during the course of the irradiation step of the method. For example, the boiling point of the solvent might be selected to be less than the temperature at which the material of the article melts or softens. Particularly preferred solvents have a latent heat of vaporization which is greater than about 1000 $J \cdot g^{-1}$, preferably greater than about 1500 $J \cdot g^{-1}$, more preferably greater than about 2000 $J \cdot g^{-1}$, and/or a specific heat capacity which is greater than about 2.0 $J \cdot g^{-1} \cdot K^{-1}$, preferably greater than about 3.0 $J \cdot g^{-1} \cdot K^{-1}$, more preferably greater than about 4.0 $J \cdot g^{-1} \cdot K^{-1}$. A value of specific heat capacity, or of latent heat of vaporization, within these ranges has the advantage that the solvent in the reaction has an enhanced ability to dissipate heat without evaporating to a significant degree, giving rise to the advantages referred to above. A particularly significant further advantage is that the formation of product from the homopolymerization reaction of the or each vinyl monomer is restricted, and any such product which is formed is retained in solution rather than being deposited in the pores within the article. This allows the product to be removed easily from the article by washing. The control over the formation of the homopolymerization product can be achieved without use of inhibiting agents, which can cause contamination problems when the article is in use in certain applications.

Water (including water based solutions) is a particularly preferred solvent.

The impregnation solution can include additional components to optimize reaction conditions such as surfactants to ensure that the solution fully impregnates the non-woven fabric, an appropriate mixture of solvents to ensure homogeneity of the solution, and so on. When the solution comprises a mixture of solvents, it will generally be preferred for at least one of the solvents to have one or more of the features discussed above (boiling point, latent heat of vaporization, specific heat capacity etc); preferably, that solvent will be present in an amount of at least about 70% by weight (based on the total weight of the solvents), more preferably at least about 80%, for example about 85% or more. Mixtures of solvents which can be used can comprise mixtures of water with one or more miscible organic solvents. Examples of suitable organic solvents include 2-propanol, ethanol, 2-methoxy ethanol, 2-butanone, ethylene glycols etc.

The ultraviolet radiation initiated reaction can be completed surprisingly quickly, for example by exposing the impregnated article to radiation for as little as 15 seconds, even as little as 5 or 10 seconds, and it has been found that the article after reaction contains a significant amount of grafted monomer, which can be sufficient for the article to be rendered wettable by aqueous solutions such as might be found in certain electrochemical devices. This is to be contrasted with techniques in which graft reactions are initiated using, for example, electron bombardment, either of impregnated article or of article prior to exposure to monomer solution, where reaction times of many minutes, even as long as 50 minutes, can be required in order to obtain a significant degree of grafting, and even after reaction times of this order, the degree of grafting reaction can be too low for many applications. Such prior techniques do not therefore lend themselves to continuous processing in the manner of the present invention.

Techniques by which exposure of the impregnated article to oxygen can be restricted include, for example, carrying out the ultraviolet irradiation step in an inert atmosphere, for example in an atmosphere of argon or nitrogen, or sealing the impregnated article between sheets of material which are impervious to oxygen, but are transparent to ultraviolet radiation of appropriate wavelength for initiating the graft reaction.

Preferably, the impregnation solution includes an initiator for the polymerization reaction. Preferably, the initiator initiates the reaction by abstracting an atomic species from one of the reacting materials, for example by abstracting a hydrogen atom from the polymer of the porous article to create a polymer radical. Following such abstraction, the polymer radical, in contact with the first vinyl monomer in solution, can initiate the formation of a grafted branch. When an atom is abstracted from the polymer of the article, the activated polymer molecule can react either with another polymer molecule so that the polymer of the article becomes cross-linked, or with the vinyl monomer in a graft reaction. An example of a suitable initiator is benzophenone. The mole ratio of the first vinyl monomer to the initiator is preferably at least about 50, more preferably at least about 100, especially at least about 175; the ratio is preferably less than about 1500, more preferably less than about 1000, especially less than about 500, more especially less than about 350; for example the ratio can be about 250.

The article of the invention can be used in applications in which suitable surface properties can be provided on a porous polymeric article by the graft reaction. In particular, an article which is made from a polymer having hydrophobic properties can be rendered hydrophilic by reaction with an appropriate first vinyl monomer. The article can then be used in applications in which wettability is important. These might include, for example, filtration and separation applications. It can be used in medical and hygiene applications, for example in which the treatment of the article surface affects the wettability of the article by body fluids. It can be used in applications in which the article reinforces a curable polymeric material in a composite product which comprises the cured polymeric material reinforced by the article of the invention, particularly when the invention comprises fibers.

Applications for the article of invention can also include use as an electrode separator in an electrochemical device. Accordingly, in a further aspect, the invention provides an electrochemical device which comprises an anode, a cathode, a quantity of an electrolyte, and an electrode separator which is provided by an article according to the invention.

Measurement of Monomer Ratio

The measurement of grafted chain length requires identifying a marker feature in the first vinyl monomer units, and by including a marker species in each chain. The mean number of first vinyl monomer units can be determined from the ratio of the number of first vinyl monomer units (from the number of marker features that can be identified) to the number of marker species in the article. It can be convenient for the marker species to be provided by the second vinyl monomer units. Techniques which can be used to determine the relative proportions of the marker feature and the marker species include isotope labelling and spectroscopic analysis (for example using techniques such as infrared, NMR and X-ray photoelectron spectroscopy), provided that the marker species that is incorporated into each chain is visible using the selected technique. The marker species can be provided by the second vinyl monomer unit when just one second vinyl monomer is generally incorporated into each grafted chain.

In the examples, described below, chain length measurements are carried out using XPS analysis with a Escascope x-ray photoelectron spectrometer (VG Scientific, East Grinstead, England) using a magnesium Kα x-ray source operating at 270 watt (13.5 kV, 20 mA) and a take-off angle of photoelectrons of 90_.

The sample to be analyzed is mounted onto a stainless steel sample holder, using stainless steel screws and then introduced into the spectrometer. The sample analysis area is approximately 4 mm×3 mm. Wide scan survey spectra, over the binding energy range 0 to 1000 eV, is acquired to identify the elements present, followed by higher energy resolution scans for the binding energy ranges of elements of interest.

Peak area and surface composition (atomic %) are determined using the VG5250 software supplied with the spectrometer. Spectra are charge-corrected by reference (J F Moulder, W F Stickle, P E Sobol, K D Bomben, "Handbook of X-ray Photoelectron Spectra—A Reference Book of Standard Spectra for Identification and Interpretation of XPS Data", edited by J Chastain, Perkin-Elmer Corporation, Eden Prairie, Minn., USA, 1992) to the aliphatic hydrocarbon peak at 284.8 eV.

By way of example, the surface composition for the carbon atom ($C_{1s}$) associated with the carbonyl group of the grafted acrylic acid (binding energy 289 eV) can be calculated together with either the surface composition of the sulphur atom ($S_{2p}$, binding energy 167.9 eV) or phosphorous atom ($P_{2p}$, binding energy 130 eV) associated with vinyl sulphonic acid or vinyl phosphonic acid second vinyl monomer. The ratio of the number of units of the first vinyl monomer in each chain to the number of units of the second vinyl monomer mean chain length of the grafted acrylic acid, when vinyl sulphonic acid is the second vinyl monomer, is calculated according to the equation:

$$\text{Monomer ratio} = \frac{\text{atomic \% carbonyl } C_{1s} \text{ of first vinyl monomer}}{\text{atomic \% } S_{2p} \text{ of second vinyl monomer}}$$

The monomer ratio will be approximately equal to the number of units of the first vinyl monomer in each chain when the number of units of the second vinyl monomer is about one.

Weight increase on grafting copolymerization

The percentage weight increase of the porous polymeric article after undergoing the graft copolymerization treatment is calculated according to according to the equation:

$$\text{Weight increase (\%)} = \frac{(W_G - W_0) \times 100}{W_0}$$

where $W_G$ is the weight of porous polymeric article after graft copolymerization treatment and $W_0$ is the weight of the porous polymeric article before treatment.

Wetting Out Time

A strip of treated porous polymeric article is laid out flat on a smooth surface. A 50_1 dropping pipette is used to deposit a drop of either deionized water or 40% w/w potassium hydroxide solution on to the surface of the article (taking care not to touch the surface of the material with the pipette). The time taken (in seconds) for the drop of liquid to be completely absorbed by the article is recorded. The procedure is repeated at six different positions on the article surface. An average time for the drop to be absorbed is calculated.

Wicking Rate

A measure of the rate at which liquid wicks through the article of the invention can be obtained using strips of the article suspended above a dish of a test solution and monitoring the rise of the solution.

A strips of the article measuring 15 mm by 150 mm is prepared with the longest dimension parallel to the machine direction. The strip is suspended over a dish containing potassium hydroxide solution (30% w/w or 40% w/w), and positioned so that 5 mm of the strip is immersed in the solution. The height which the solution rises above the surface in the dish after 10 minutes is recorded.

Dry Storage Test

The following accelerated storage test is carried out to estimate the shelf life of the treated porous polymeric material. Vertical wicking height is measured according to the procedure described above. Additional samples are stored in the dry at 70° C. After different time periods samples are removed from storage and their vertical wicking height remeasured.

COMPARATIVE EXAMPLE

This example illustrates the reactivity of different hydrophilic monomers to grafting copolymerization to a porous polymeric substrate.

A number of grafting solutions were prepared containing different hydrophilic monomers. The solutions were formulated as follows (percentage by weight):

|  | Grafting solution | | | |
| --- | --- | --- | --- | --- |
|  | C1 | C2 | C3 | C4 |
| Vinylsulphonic acid sodium salt (BASF AG) | 20 | | | |
| Vinylphosphonic acid (97%, Sigma-Aldrich) | | 20 | | |
| Vinylacetic acid (97%, Sigma-Aldrich) | | | 20 | |
| Acrylic acid (99%, Sigma-Aldrich) | | | | 20 |
| Benzophenone (99%, Lambson Fine Chemicals) | 0.15 | 0.15 | 0.15 | 0.15 |
| 2-propanol (99+%, Sigma-Aldrich) | 19.85 | 20 | 20 | 20 |
| Deionized water | 60 | 58.85 | 59.85 | 59.85 |

A nonwoven polypropylene spun fiber fabric supplied by Nippon Kodoshi Corporation, Japan was selected to be graft copolymerized. The fabric had a basis weight of 53 g·m$^{-2}$ and a nominal thickness of 115 μm. The mean fiber diameter was 11.3 μm.

The grafting procedure was carried out as follows. A sample of the fabric, 10 cm×10 cm square, was accurately weight and then impregnated with Solution C1 described above by immersing the fabric in the solution until completely wetted out.

The impregnated fabric was placed between two pieces of polyethylene film (thickness 50 μm) and all the air excluded. The fabric and polyethylene film was then placed between two pieces of quartz glass. Each side of the fabric article was then sequentially exposed for 30 seconds per side to UV radiation from a medium pressure mercury lamp positioned 22 μm from the sample. The mercury lamp had a power output of 43 W·cm$^{-1}$.

The treated fabric was then washed in boiling deionized water for 20 minutes, dried at 70° C. and re-weighed.

A further sample of fabric was treated as above with an UV exposure time of 120 seconds per side.

The above procedure was then repeated on the fabric using the three other grafting solutions.

The percentage weight increase and the wetting out time of the treated fabrics are set out below. The wet out time was measured using deionized water and the vertical wicking height was measured using 30% w/w potassium hydroxide solution. It was determined that the starting material was non-wetting, with a zero vertical wicking height.

|  | Grafting solution | | | | | | | |
| --- | --- | --- | --- | --- | --- | --- | --- | --- |
|  | C1 | | C2 | | C3 | | C4 | |
| UV exposure time per side (s) | 30 | 120 | 30 | 120 | 30 | 120 | 30 | 120 |
| Weight increase (%) | 0.0 | 0.17 | 0.0 | 0.19 | 0.16 | 0.16 | 0.35 | 6.23 |
| Wet out time (s) | >300 | >300 | >300 | >300 | >300 | >300 | >300 | >300 |
| Vertical wicking height (mm) | 0 | 0 | 0 | 0 | 0 | 0 | 5 | 20 |

The data shows that the monomers in Solutions C1 to C3 do not graft to the non-woven fabric to any significant degree. Grafting of the monomer in Solution C4 (acrylic acid) gives rise to a significant weight increase.

Example 1

Using the same nonwoven fabric and procedure as described in the Comparative Example above, further materials were treated using the following grafting solutions in which proportions are expressed in terms of percentage by weight. The table also includes the ratio of moles of acrylic acid to the moles of the second vinyl monomer (vinyl sulphonic acid, vinyl phosphonic acid, vinyl acetic acid etc):

|  | Grafting solution | | |
| --- | --- | --- | --- |
|  | 1.1 | 1.2 | 1.3 |
| Vinylsulphonic acid sodium salt | 10 | | |
| Vinylphosphonic acid | | 10 | |
| Vinylacetic acid | | | 10 |
| Acrylic acid | 16 | 16 | 16 |
| Benzophenone | 0.15 | 0.15 | 0.15 |
| 2-propanol | 10 | 10 | 10 |
| Deionised water | 63.85 | 63.85 | 63.85 |
| Mole ratio | 2.9 | 2.4 | 1.9 |

The properties of graft copolymerized fabrics are set out below, and compared with the fabric treated using solution C4 in the Comparative Example above:

|  | Grafting solution | | | | | | | |
| --- | --- | --- | --- | --- | --- | --- | --- | --- |
|  | 1.1 | | 1.2 | | 1.3 | | C4 | |
| UV exposure time per side (s) | 30 | 120 | 30 | 120 | 30 | 120 | 30 | 120 |
| Weight increase (%) | 0.9 | 1.8 | 1.5 | 2.9 | 0.6 | 1.5 | 0.4 | 6.2 |
| Wet out time (s) | 5 | 5 | 6 | 5 | >300 | 16 | >300 | >300 |
| Vertical wicking height (mm) | 63 | 10 | 62 | 65 | 0 | 40 | 5 | 20 |
| Chain length | 15.0 | 9.0 | 20.5 | 12.2 | — | — | — | — |

The data above show that a graft copolymerized fabric can be produced with short grafted chain length and good wet out and wicking properties by using a combination of the reactive hydrophilic monomer acrylic acid with an unreactive comonomer.

Example 2

A nonwoven fabric made by a wet laid process was selected containing, about 80% w/w of an 18 μm diameter bicomponent fiber with a polyethylene outer-sheath and a polypropylene core, and 20% w/w of a 12 μm diameter monocomponent polypropylene fiber. The non-woven fabric had a mean basis weight of 65 g·m$^{-2}$ and a mean thickness of 160 μm. The material was supplied by Freudenberg Nonwovens Group, Germany.

This nonwoven fabric was treated according to the procedure described in the Comparative Example above using the following grafting solutions (percentage by weight). The UV exposure time was 120 seconds per side.

|  | Grafting solution | | | | | |
| --- | --- | --- | --- | --- | --- | --- |
|  | 2.1 | 2.2 | 2.3 | 2.4 | 2.5 | 2.6 |
| Vinylsulphonic acid sodium salt | 10 | 7.5 | 5 | 2.46 | 2.46 | 2.46 |
| Acrylic acid | 8 | 8 | 8 | 8 | 16 | 32 |
| Benzophenone | 0.15 | 0.15 | 0.15 | 0.15 | 0.15 | 0.15 |
| 2-propanol | 10 | 10 | 10 | 10 | 10 | 10 |
| Deionised water | 71.85 | 74.35 | 76.85 | 79.39 | 71.39 | 55.39 |
| Mole ratio | 1.44 | 1.93 | 2.89 | 5.87 | 11.74 | 23.49 |

The properties of the treated fabrics are set out below:

|  | Grafting solution | | | | | |
| --- | --- | --- | --- | --- | --- | --- |
|  | 2.1 | 2.2 | 2.3 | 2.4 | 2.5 | 2.6 |
| Wet out time (s) | 3 | 4 | 2 | 1 | 7 | 92 |
| Vertical wicking height (mm) | 60 | 58 | 37 | 60 | 31 | 9 |
| Chain length | 11.4 | 13.9 | 20.1 | 16.5 | 24.3 | 33.5 |

Figure 1:
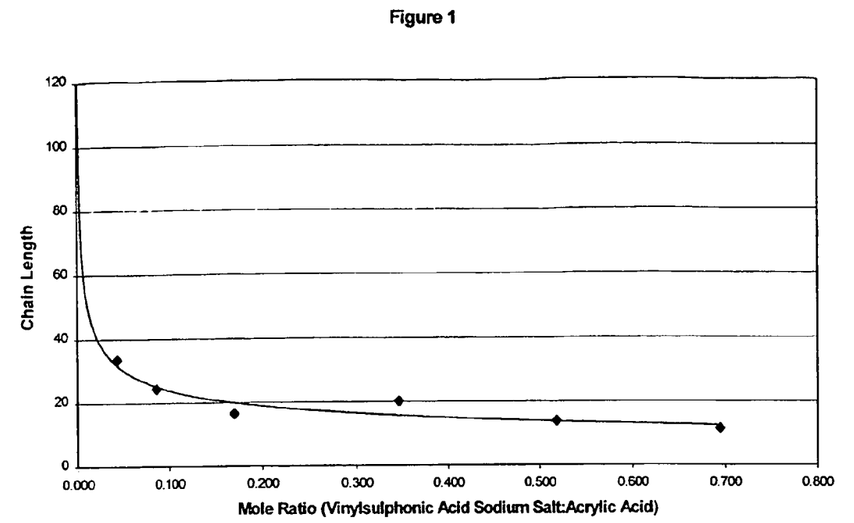
FIG. 1 is a graphical representation of chain length versus mole ratio for Example 2 herein.

The data shows that as the chain length increases to greater than about 30 acrylic acid units the wet out time increases and the vertical wicking height decreases to levels that make the fabric less suitable for battery separator applications. The data also shows that, as the mole ratio of acrylic acid to co-monomer (vinylsulphonic acid, sodium salt) increases, the grafted chain length increases. A graph of chain length against mole ratio (vinylsulphonic acid, sodium salt:acrylic acid) is shown in FIG. 1. By using a simple power law curve fitting equation an estimate of the grafted chain length with no co-monomer present can be made. As can be seen in the graph, this value is about 100 acrylic acid units.

Example 3

Continuous strips of the non-woven fabric described in the Comparative Example were impregnated with a number of different grafting solution formulated as follows (percentage by weight) by passing the fabric around rollers located in a chamber with an atmosphere of nitrogen, so that the fabric passed through the solution:

|  | Grafting solution | | | | | |
| --- | --- | --- | --- | --- | --- | --- |
|  | 3.1 | 3.2 | 3.3 | 3.4 | 3.5 | 3.6 |
| Vinylsulphonic acid sodium salt | 10 | 7.5 | 5 | 2.5 | 2.5 | — |
| Acrylic acid | 16 | 16 | 16 | 16 | 32 | 16 |
| Benzophenone | 0.15 | 0.15 | 0.15 | 0.15 | 0.15 | 0.15 |
| 2-propanol | 10 | 10 | 10 | 10 | 10 | 10 |
| Deionized water | 63.85 | 66.35 | 68.85 | 71.35 | 55.35 | 68.85 |
| Mole ratio | 2.89 | 3.85 | 5.78 | 11.55 | 23.10 | — |

The impregnated fabric, still in a nitrogen atmosphere, was passed between four medium pressure mercury lamps, positioned parallel to one another, two each side of the chamber, the chamber at that point being provided by quartz windows. Each of the lamps had a power output of 79 W·cm$^{-1}$, and was positioned 10 cm from the fabric. Each lamp produced a parallel beam having a width of 10 cm. The total exposure time of the fabric to the radiation was about 10 seconds.

The fabric was then washed in de-ionized water to remove unreacted components, and dried on two rollers at 60° C.

The properties of the graft copolymerized fabric are set out below:

|  | Grafting solution | | | | | |
| --- | --- | --- | --- | --- | --- | --- |
|  | 3.1 | 3.2 | 3.3 | 3.4 | 3.5 | 3.6 |
| Wet out time (s) | 51 | 56 | 63 | 116 | 151 | 190 |
| Vertical wicking height (mm) | 83 | 80 | 70 | 52 | 59 | 46 |
| Chain length | 15.7 | 17.5 | 20.1 | 29.3 | 36.7 | (180) |

Figure 2:
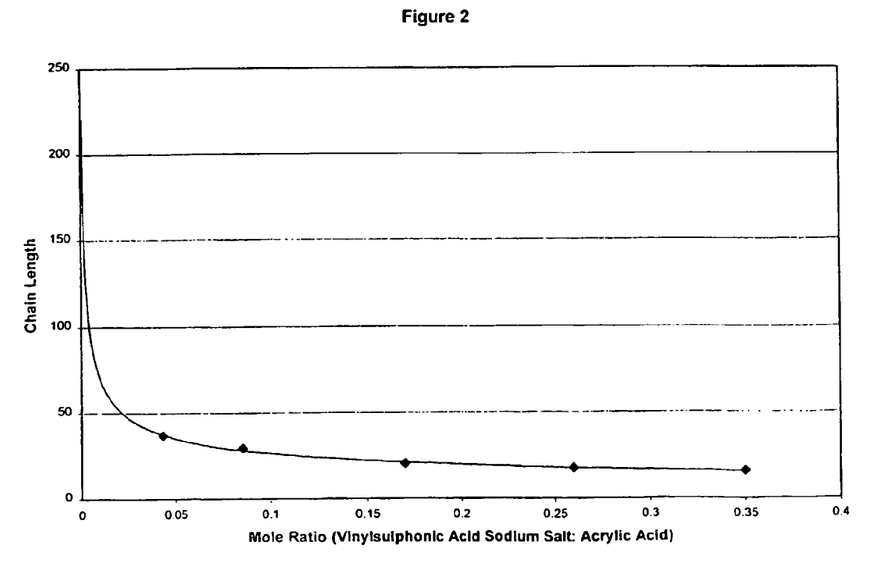
FIG. 2 is a graphical representation of chain length verses mole ratio in connection with Example 3 herein.

The data shows that, as the chain length increases to greater than about 40 acrylic acid units the wet out time increases and the vertical wicking height decreases to levels that make the fabric less suitable for battery separator applications. A graph of chain length against mole ratio (vinylsulphonic acid, sodium salt:acrylic acid) is shown in FIG. 2. The estimated grafted chain length with no second vinyl monomer present (solution 3.6) is about 180 acrylic acid units. For the grafted chain length to be less than 40 acrylic acid units the mole ratio (acrylic acid:vinylsulphonic acid sodium salt) of the monomers in the grafting solution should be less than 25.

Example 4

The non-woven fabric material used in Example 2 was treated according to the procedure described in Example 1, using the grafting solutions described below (percentage by weight). Solution 4.3 does not contain a second vinyl monomer and is included for the purposes of comparison. The UV exposure time was 30 seconds for each side:

|  | Grafting solution | | |
| --- | --- | --- | --- |
|  | 4.1 | 4.2 | 4.3 |
| Vinylsulphonic acid sodium salt | 10 | | |
| Vinylphosphonic acid | | 10 | |
| Acrylic acid | 16 | 16 | 16 |
| Benzophenone | 0.15 | 0.15 | 0.15 |
| 2-propanol | 10 | 10 | 10 |
| Deionized water | 63.85 | 63.85 | 73.85 |
| Mole ratio | 2.9 | 2.4 | — |

The shelf life of the treated fabrics was estimated using the Dry Storage Test described above. The results of the test, in terms of vertical wicking rate (mm) are set out below and clearly show that fabrics made according to the present invention (grafting solutions 4.1 and 4.2) have superior shelf lives compared with the fabric in the comparative example (grafting solution 4.3).

|  | Days storage at 70° C. | | | | |
| --- | --- | --- | --- | --- | --- |
| Solution | 0 | 3 | 4 | 6 | 10 |
| 4.1 | 74 | 57 | 58 | 53 | 53 |
| 4.2 | 59 | 58 | 58 | 51 | 60 |
| 4.3 | 58 | 32 | 35 | 2 | 0 |

Example 5

A nickel-metal hydride (Misch metal electrode) button cell was constructed with a separator of the type described above in Example 3 (grafting solution 3.3). Each electrode was circular with a diameter of 20 mm. The electrolyte was 6 molar potassium hydroxide containing 1 molar lithium hydroxide. The nominal capacity of the cell was 300 mAh. The cell was charged at 30 mA (0.1 C rate) for 12 hours and then discharged at 30 mA to a 1.0 volt cut-off. The cell could be repeatedly charged and discharged with a capacity on discharge of over 300 mAh.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A method of making a porous polymeric article whose surface has grafted to it chains of polymerized vinyl monomer groups, which comprises:

a. impregnating a porous polymeric article with a solution of a first vinyl monomer and a second vinyl monomer,
   b. exposing the impregnated article to ultraviolet radiation while exposure of the article to oxygen is restricted, to cause (i) the first vinyl monomer to form polymerized chains which are grafted to the surface of the polymeric article, and (ii) the second vinyl monomer to react with the polymerized chains of the first vinyl monomer,
   wherein the ratio of the molar concentration of said first vinyl monomer in the solution to that of said second vinyl monomer is at least about 1.5.

2. A method as claimed in claim 1, wherein said porous polymeric article comprises a non-woven fabric formed from fibers whose surface is provided by a polymeric material.

3. A method as claimed in claim 1, wherein said polymeric article comprises a microporous sheet.

4. A method as claimed in claim 1, wherein said first vinyl monomer comprises an ethylenically unsaturated carboxylic acid or an ester thereof.

5. A method as claimed in claim 4, wherein said first vinyl monomer comprises acrylic acid or an ester thereof.

6. A method as claimed in claim 1, wherein said second vinyl monomer is selected from the group consisting of vinyl acetic acid, vinyl sulphonic acid, vinyl phosphonic acid, and the salts and esters thereof.

7. A method as claimed in claim 1, wherein said polymer comprises polypropylene.

8. A method of making a porous polymeric article whose surface has polymerized vinyl monomer groups grafted thereto, which comprises:

a. impregnating a porous polymeric article with a solution of a first vinyl monomer, a second vinyl monomer and an initiator,
   b. exposing the impregnated article to ultraviolet radiation with exposure of the article to oxygen is restricted,
   wherein said first vinyl monomer, said second vinyl monomer, and said initiator are selected so that said first vinyl monomer will form grafted chains and said second vinyl monomer will not form grafted chains in said step of exposing said impregnated article to ultraviolet radiation, whereby said exposing step causes (i) said first vinyl monomer to form polymerized chains which are grafted to said surface of said polymeric articles, and (ii) said second vinyl monomer to react with said polymerized chains of said first vinyl monomer.

9. A method as claimed in claim 8, wherein said porous polymeric article comprises a non-woven fabric formed from fibers whose surface is provided by a polymeric material.

10. A method as claimed in claim 8, wherein said polymeric article comprises a microporous sheet.

11. A method as claimed in claim 8, wherein said first vinyl monomer comprises an ethylenically unsaturated carboxylic acid or an ester thereof.

12. A method as claimed in claim 11, wherein said first vinyl monomer comprises acrylic acid or an ester thereof.

13. A method as claimed in claim 8 , wherein said second vinyl monomer is selected from the group consisting of vinyl acetic acid, vinyl sulphonic acid, vinyl phosphonic acid, and the salts and esters thereof.

14. A method as claimed in claim 8, wherein the ratio of the molar concentration of said first vinyl monomer in the solution to that of said second vinyl monomer is at least about 1.5.

15. A method as claimed in claim 8, wherein said polymer comprises polypropylene.

16. A method of making a porous polymeric article whose surface has polymerized vinyl monomer groups grafted thereto, which comprises:

a. impregnating a porous polymeric article with a solution of a first vinyl monomer and a second vinyl monomer, b. exposing said impregnated article to ultraviolet radiation while exposure of the article to oxygen is restricted, to cause (i) said first vinyl monomer to form polymerized chains which are grafted to the surface of said polymeric article, and (ii) said second vinyl monomer to react with the polymerized chains of said first vinyl monomer wherein said second vinyl monomer is selected from the group consisting of vinyl sulphonic acid, vinyl phosphonic acid, and the salts and esters thereof.

17. A method as claimed in claim 16, wherein said porous polymeric article comprises a non-woven fabric formed from fibers whose surface is provided by a polymeric material.

18. A method as claimed in claim 16, wherein said polymeric article comprises a microporous sheet.

19. A method as claimed in claim 16, wherein said first vinyl monomer comprises an ethylenically unsaturated carboxylic acid or an ester thereof.

20. A method as claimed in claim 19, wherein said first vinyl monomer comprises acrylic acid or an ester thereof.

21. A method as claimed in claim 16, wherein the ratio of the molar concentration of said first vinyl monomer in the solution to that of said second vinyl monomer is at least about 1.5.

22. A method as claimed in claim 16, wherein said polymer comprises polyethylene.

\* \* \* \* \*

UNITED STATES PATENT AND TRADEMARK OFFICE
CERTIFICATE OF CORRECTION

| | | |
|---|---|---|
| PATENT NO. | : 7,625,955 B2 | Page 1 of 1 |
| APPLICATION NO. | : 10/525895 | |
| DATED | : December 1, 2009 | |
| INVENTOR(S) | : Giovanni Gentilcore and Tracy Hoar | |

It is certified that error appears in the above-identified patent and that said Letters Patent is hereby corrected as shown below:

IN THE SPECIFICATIONS:
    Column 6, line 58, delete "does" and insert therefor --do--.
    Column 7, line 13, delete "the" second instance.
    Column 9, line 55, delete "90_" and insert therefor --90°--.
    Column 10, line 60, "strips" should read --strip--.
    Column 11, line 59, delete "weight" and insert therefor --weighed--.
    Column 11, line 64, delete "was" and insert therefor --were--.

IN THE CLAIMS:
    Column 16, claim 8, line 35, delete "with" and insert therefor --where--.

Signed and Sealed this
Fifth Day of April, 2011

David J. Kappos
*Director of the United States Patent and Trademark Office*